United States Patent [19]
Johnson

[11] Patent Number: 6,032,841
[45] Date of Patent: Mar. 7, 2000

[54] HOLDER FOR SECURING ARTICLES TO A CARRIER

[76] Inventor: Robert C. Johnson, 1245 Evergreen Pl., Apt. 38, Auburn, Calif. 95603-3471

[21] Appl. No.: 09/021,412

[22] Filed: Feb. 10, 1998

Related U.S. Application Data

[60] Provisional application No. 60/037,716, Feb. 12, 1997.

[51] Int. Cl.[7] .................. A45F 5/00; B62J 11/00
[52] U.S. Cl. ............ 224/463; 224/148.6; 224/250; 224/674; 224/414; 224/572; 224/425; 224/436
[58] Field of Search ................ 224/250, 674, 224/572, 414, 463, 148.6, 148.5, 436, 425; 24/301, 300

[56] References Cited

U.S. PATENT DOCUMENTS

| | | |
|---|---|---|
| D. 291,044 | 7/1987 | Canning . |
| D. 333,071 | 2/1993 | Lim . |
| 2,524,639 | 10/1950 | Saunders . |
| 2,830,747 | 4/1958 | Creste ................................. 224/150 |
| 4,282,279 | 8/1981 | Strickland . |
| 4,618,081 | 10/1986 | Miree . |
| 4,848,625 | 7/1989 | Lucia ................................. 224/250 |
| 4,951,910 | 8/1990 | March . |
| 4,984,724 | 1/1991 | Johnston ........................... 224/901.4 |
| 5,007,566 | 4/1991 | Fick . |
| 5,170,917 | 12/1992 | Tourigny . |
| 5,497,920 | 3/1996 | Moeller et al. . |
| 5,692,268 | 12/1997 | Case ................................. 224/463 |

*Primary Examiner*—Linda J. Sholl
*Attorney, Agent, or Firm*—Nixon & Vanderhye

[57] ABSTRACT

A holder includes a holder body formed of flexible, resilient sheet material having tabs at its opposite edges. The holder body is formed of a non-skid, high-friction material such as rubber. In use, the holder body is wrapped about the article to be carried, such as a fluid-containing bottle, and carrier, such as a bicycle frame, forming an enclosure therefor. The tabs are secured to one another by Velcro®-type fasteners. By stretching the holder body about the article and the carrier, the article and carrier are releasably firmly secured to one another without slippage relative to one another or to the holder body.

4 Claims, 3 Drawing Sheets though it will be appreciated that other types of fasteners, such as buttons, snaps, buckles, hooks or latches or the like may be used. In the preferred embodiment, the
HOLDER FOR SECURING ARTICLES TO A CARRIER

RELATED APPLICATIONS

This application claims the benefit of U.S. provisional patent application No. 60/037,716, filed Feb. 12, 1997.

TECHNICAL FIELD

The present invention relates to a holder for securing an article to a carrier, for example, a holder for securing a bottle containing fluid, often used by bicyclists, hikers and joggers for fluid replacement, to the bicycle or person of the hiker or jogger. More specifically, the present invention relates to a holder that can be used by individuals without modification to existing equipment, e.g., a bicycle frame, and which holder is substantially low in cost and enables a wide range of articles, for example, fluid-containing bottles, flashlights, tire pumps and the like, to be releasably secured to a carrier such as a bicycle frame, an individual's belt or the like.

BACKGROUND OF THE INVENTION

While the following description relates preferably and primarily to a holder for releasably securing a fluid-containing bottle to a carrier such as a bicycle frame or a belt worn by an individual, it will be appreciated that the holder has other uses and applications such as securing various articles to various types of carriers, for example, securing flashlights, tire pumps, collapsible tents, clothing bags, food containers, spray cans, cellular phones and the like to various types of carriers such as a bicycle frame, backpack strap, belt or the like. As people become health-conscious and have increased the intensity and duration of their workout, the need to replenish fluids lost during exercise has also become more important. It is not uncommon for people to ride bicycles more than forty miles in a single ride, hike more than twenty miles or jog more than ten miles at a time. The ability to replenish lost fluids during exercise is very important. If the fluids are not replaced in sufficient quantity or in timely manner, cramps, fatigue and nausea can reduce the efficacy of the exercise program.

Various types of fluid replacement bottles and holders for the bottles have been proposed and constructed in the past. For example, the most popular type of holder for bicycles is a cage formed of substantially rigid plastic or metal material and designed to be permanently attached to the bicycle frame. The fluid-containing bottle, typically formed of plastic, is slid into the holder and held in place by friction, including the weight of the contents of the bottle. Holders of this type are typically attached at fixed points on the bicycle frame using screws or bolts and an appropriate tool. The screws are passed through the holes in the holder and secured to threads manufactured into the bicycle frame. Usually, the bicycle frame manufacturer provides mounting locations for at least one holder.

One problem with such arrangement is the need to attach the holder to a specific location on the bicycle frame. This limits the user to only the number of fluid-containing bottles deemed necessary by the bicycle frame manufacturer. Another problems relates to the permanent nature of the bottle holder mounting. This mounting typically cannot be removed without the use of tools and therefore cannot readily be shared among several bicycles.

For joggers and hikers, the most popular holder for a fluids bottle is a fabric bag sewn onto a belt. The fluid-containing bottle is placed in the bag and held in place with a drawstring or strap around the neck of the bottle. Holders of this type usually carry only one bottle, typically containing water, and strap around the user's waist. Another popular type has an arm sling instead of a belt and is worn over the user's shoulder, with the bottle hanging freely. A problem with the foregoing described holders is the limited number of fluid bottles they can hold. The user cannot easily carry additional bottles and the carrier, e.g., the belt, usually prevents wearing another holder. The loose fit of the sling-type holder also disadvantageously causes the bottle to swing freely and impacts the user's body while jogging or running.

A more serious limitation, however, is the need for a fluid-containing bottle of a fixed size. These prior holders assume a fixed size fluid-containing bottle of the type used by professional athletes. This limitation ignores the numerous bottle shapes available to the typical user.

DISCLOSURE OF THE INVENTION

In accordance with the present invention, there is provided a holder for releasably securing an article to a carrier and which holder employs a flexible wraparound system for securing the article and carrier to one another without danger of slippage or unwanted inadvertent release of the article from the holder and carrier. The flexible wraparound system of the present invention enables many different articles and different sizes of articles to be readily and easily secured to different carriers and different sizes of carriers and in different relative orientations. Moreover, the holder also can be inexpensively manufactured to the required shape.

In a preferred embodiment of the present invention, useful, for example, for releasably securing a fluid-containing bottle to a bicycle frame or the belt of a user, the holder comprises a holder body formed of a flexible sheet material having a pair of opposite edges with fastener parts on the opposite edges, respectively, for releasably securing the opposite edges to one another whereby the holder body is engageable about the bottle and bicycle frame, thereby releasably securing the bottle to the frame. Thus, the holder body forms an enclosure for receiving the bottle (article) and bicycle frame (carrier) when the edges of the holder are secured to one another. Preferably, the holder body is formed of a resilient elastic sheet material which can be stretched such that when the edges are secured to one another, elastic biasing forces are applied to the bottle and frame by the holder body. The natural elastic biasing forces generated by stretching the holder secure the bottle to the frame within the holder body without slippage. Because the material can be stretched, various different types and sizes of articles can be secured by the holder to various different types and sizes of carriers. Additionally, the interior surface of the holder, at least for those areas in contact with the article being carried and the carrier itself, are formed of a high-friction, non-skid material so that the articles cannot slip or be inadvertently released from the holder and carrier.

In a preferred form of holder, the holder body includes opposite end (top and bottom) portions and an intermediate portion between the opposite end portions. Each of the opposite edges of the holder body includes a pair of projecting tabs spaced from one another. The tabs form generally parallel continuations of the respective opposite end portions of the holder body. The tabs carry fastener parts preferably comprising hook-and-loop fasteners of the Velcro® type, although it will be appreciated that other types of fasteners, such as buttons, snaps, buckles, hooks or latches or the like may be used. In the preferred embodiment, the holder body is specifically formed so that a bicyclist may use the holder to attach a fluid-containing bottle to a bicycle frame or a hiker or jogger may attach the bottle to a belt or strap. To releasably secure the fluid-containing bottle to the bicycle frame, the holder body is wrapped about the bottle and frame and the fastener parts of the tabs are overlapped and secured to one another, thereby securing the opposite edges of the holder to one another, tightly securing the bottle against the bicycle frame. To attach the holder to an individual's belt, the belt may be passed along the intermediate portion of the holder body between the projecting tabs. The tabs are then secured to one another about the bottle. The bottle and holder are thus secured to the individual's belt with the belt passing between the intermediate portion of the holder body and the bottle and between the tabs.

In a preferred embodiment according to the present invention, there is provided a holder for releasably securing an article to a carrier, comprising a holder body formed of flexible resilient sheet material having a pair of opposite edges and fastener parts on the opposite edges, respectively, for releasably securing the opposite edges to one another whereby the holder body is engageable about the article and carrier for securing the article to the carrier.

In a further preferred embodiment according to the present invention, there is provided a holder for releasably securing an article to a carrier, comprising a holder body formed of flexible sheet material having a pair of opposite edges, fastener parts on the opposite edges, respectively, for releasably securing the opposite edges to one another whereby the holder body is engageable about the article and carrier for securing the article to the carrier, the holder body having an interior surface with portions thereof engageable with the article and carrier, the holder body including opposite end portions and an intermediate portion between the opposite end portions, the fastener parts including a first pair of tabs projecting from one of the opposite edges and spaced from one another, the tabs forming generally parallel continuations of respective opposite end portions of the holder body.

In a still further preferred embodiment according to the present invention, there is provided a method of securing an article to a carrier therefor using a holder including a holder body formed of flexible resilient sheet material having a pair of opposite edges and fastener parts on the opposite edges for releasably securing the opposite edges to one another forming an enclosure for the article and carrier, including the steps of (a) wrapping the holder body about the carrier and the article to encompass both the article and the carrier within the holder body, (b) stretching the holder body about the article and carrier to generate elastic biasing forces in the holder body holding the article and carrier against one another and (c) securing the fastener parts to one another to maintain the elastic biasing forces of the holder body on the article and the carrier.

Accordingly, it is a primary object of the present invention to provide a novel and improved holder for readily and easily securing an article to a carrier without slippage.

DETAILED DESCRIPTION OF THE DRAWINGS

Figure 1:
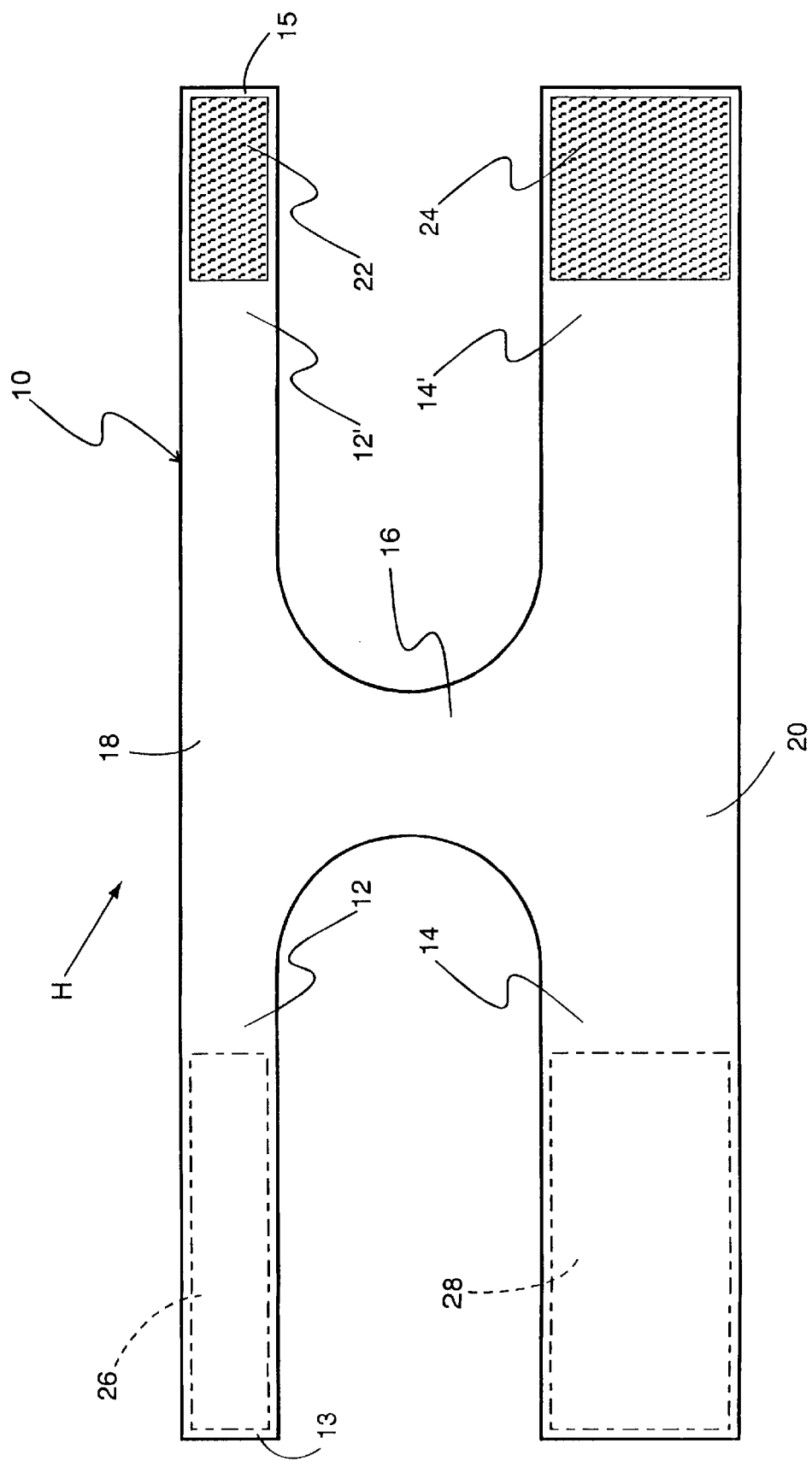
FIG. 1 is an elevational view of a preferred embodiment of a holder for releasably securing an article to a carrier in accordance with the present invention.

Referring to the drawings and particularly to FIG. 1, there is illustrated a holder, generally designated H, comprised of a holder body 10 formed of a flexible material, preferably a flexible resilient or elastic sheet material such as rubber or neoprene. In the preferred form of the present invention, the material is resilient or elastic, although it will be appreciated that non-resilient or non-elastic materials such as plastic, leather, webbing and other flexible materials may be used. A fabric overlay may also be provided, e.g., along the outside surface of the holder body 10 for additional strength and aesthetic reasons. Also, the preferred material has a high-friction, non-skid surface along one side for contacting the article being carried and the carrier so that the article and carrier do not slip relative to one another or to the holder body.

The holder body 10 includes a pair of upper tabs 12 and 12', a pair of lower tabs 14 and 14', an intermediate portion 16, opposite end portions 18 and 20, respectively and opposite edges 13 and 15, respectively. The tabs 12 and 12' form opposite continuations of the upper end portion 18, while the tabs 14 and 14' form opposite continuations of the lower end portion 20. As illustrated in FIG. 1, the upper and lower tabs are spaced from one another. Fastener parts are provided on the tabs 12, 14 and 12' and 14'. Preferably, these fastener parts comprise hook-and-loop Velcro®-type fasteners 22, 24 and 26, 28, respectively. As noted previously, other types of fasteners may be used, such as buttons, snaps, buckles, hooks, latches and the like. It will also be appreciated that only one pair of tabs, for example, tabs 12 and 14, may be used, while the opposite end edge of the holder body may be without tabs, i.e., form a continuous edge with a hook or loop type fastener part to be overlapped by the tabs 12 and 14.

Figure 2:
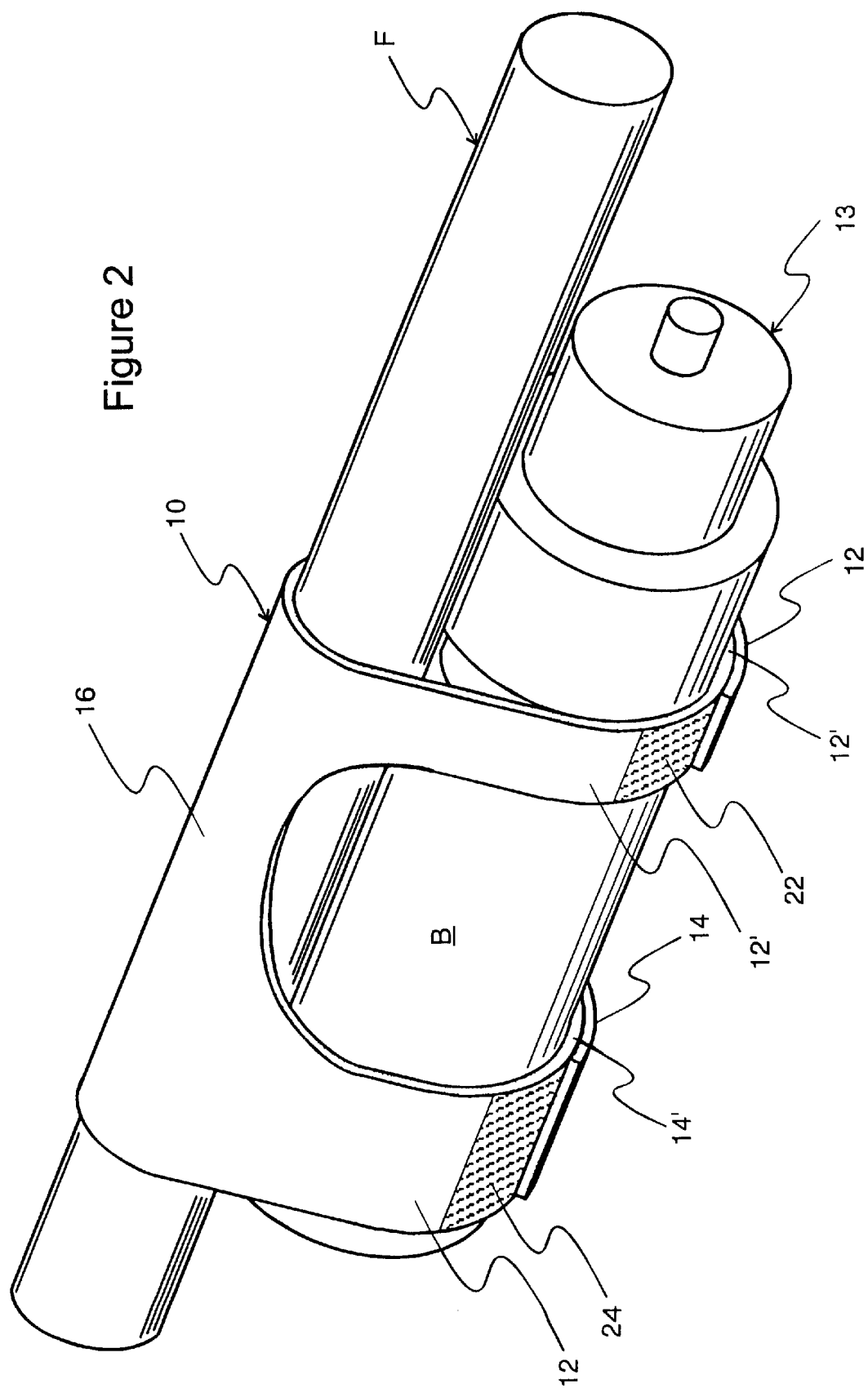
FIG. 2 is a perspective view of the holder of FIG. 1, for releasably securing a fluid-containing bottle to a carrier, for example, a bicycle frame.

Referring now to FIG. 2, wherein a preferred form of the holder is illustrated securing an article such as a fluid-containing bottle B to a carrier such as a portion of a bicycle frame F, it will be appreciated that the bottle B may be placed next to, e.g., parallel to, the frame part F. By wrapping the holder body 10 around the frame F and bottle B, the tabs 12 and 14 overlap and are secured to the tabs 12' and 14', respectively, whereby holder body 10 completely encompasses both the bottle B and frame F. Where the preferred elastic material is employed, the holder body is stretched when wrapped about the bottle and frame, such that when the tabs are secured to one another, the elastic resiliency of the holder body tending to return to its non-stretched state maintains the bottle B bearing against the frame F. Additionally, the non-skid, high-friction surfaces along the interior of the holder body engage and grip the bottle B and frame F such that they do not slip relative to one another or the holder H.

Figure 3:
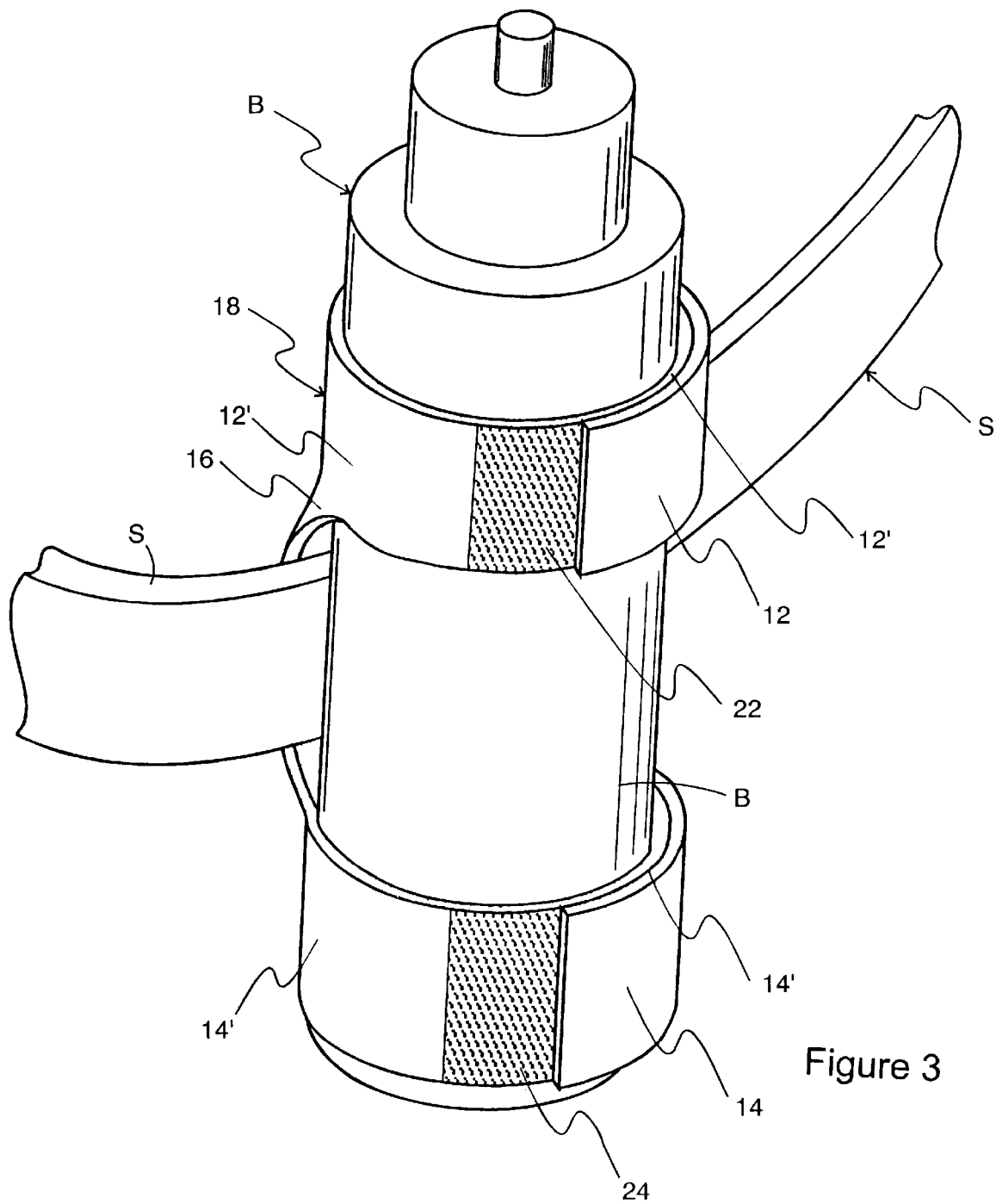
FIG. 3 is a perspective view of a holder releasably securing the fluid-containing bottle to a strap or belt carried by an individual.

To secure an article such as a fluid-containing bottle B to a strap, such as a belt worn by an individual, as illustrated in FIG. 3, the holder H may be placed along the inside of the strap S with the inner surface of the intermediate portion 16 of the holder body bearing against the inner surface of the strap S. The fluids bottle B can then be placed along the outside surface of the strap S and the tabs secured to one another about upper and lower portions of the bottle, as illustrated. Thus, the tabs secure the bottle against the strap, and by passing between the intermediate portion 16 of the holder body and the bottle B, the holder and bottle are secured to the strap.

It will be appreciated from the foregoing that various other types of articles may be secured to various types of carriers, forming the holder of the present invention. In a preferred form, the holder is formed of flexible, resilient, elastic rubber, which has a stretchable fabric covering along its outside surface for strength and aesthetic reasons.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In combination, an article, a carrier and a holder for releasably securing an article to the carrier:

a holder body formed of a continuous flexible elastic sheet material having a pair of opposite edges;

fastener parts adjacent said opposite edges, respectively, for releasably securing said opposite edges to one another whereby the holder body is engageable about the article and carrier for securing the article to the carrier;

said holder body including opposite end portions and an intermediate portion between said opposite end portions, said intermediate portion being recessed from said opposite edges between said opposite end portions, said fastener parts on one of said opposite edges including a first pair of projecting tabs spaced from one another and forming generally parallel continuations of respective opposite end portions of said holder body;

said fastener parts on another of said opposite edges including a second pair of projecting tabs spaced from one another and forming generally parallel continuations of respective opposite end portions of said holder body and in respective alignment with said first pair of tabs when said opposite edges are secured to one another, said holder body having interior surface portions formed of a substantially non-slip, high friction material for engaging the article and the carrier;

the distance between said opposite edges being greater than the distance between said opposite end portions;

said holder body being wrapped around said article and said carrier with said end portions and said intermediate portion forming an enclosure therefor, said carrier extending within said enclosure and engaging said intermediate portion when said opposite edges are secured to one another, said carrier and said article extending lengthwise within said enclosure with said opposite end portions and said intermediate portion of said holder bearing against one of said carrier and said article.

2. A holder according to claim 1 wherein said interior surface portions are formed of rubber.

3. A holder according to claim 1 wherein said interior surface portions are formed of neoprene.

4. A holder according to claim 1 wherein said fastener parts comprise hook-and-loop fasteners.

* * * * *